United States Patent
Newman et al.

(10) Patent No.: US 6,362,293 B1
(45) Date of Patent: Mar. 26, 2002

(54) SYNDIOTACTIC VINYLIDENE AROMATIC POLYMERIZATION PROCESS

(75) Inventors: Thomas H. Newman, Midland; Karen K. Borodychuk, Mt. Pleasant, both of MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/623,950

(22) PCT Filed: Mar. 15, 1999

(86) PCT No.: PCT/US99/05673
§ 371 Date: Nov. 27, 2000
§ 102(e) Date: Nov. 27, 2000

(87) PCT Pub. No.: WO99/51650
PCT Pub. Date: Oct. 14, 1999

Related U.S. Application Data
(60) Provisional application No. 60/080,964, filed on Apr. 7, 1998.

(51) Int. Cl.$^7$ .............................. C08F 4/64; C08F 12/02

(52) U.S. Cl. ................ 526/160; 526/128; 526/132; 526/161; 526/164; 526/165; 526/907; 526/346

(58) Field of Search .............................. 526/160, 161, 526/165, 128, 907, 132, 164, 346

(56) References Cited

U.S. PATENT DOCUMENTS

| | | | |
|---|---|---|---|
| 4,680,353 A | 7/1987 | Ishihara et al. | |
| 5,045,517 A | 9/1991 | Campbell, Jr. et al. | |
| 5,066,741 A | 11/1991 | Campbell, Jr. | |
| 5,206,197 A | 4/1993 | Campbell, Jr. | |
| 5,374,696 A | 12/1994 | Rosen et al. | |
| 5,536,797 A | 7/1996 | Nickias et al. | |
| 5,646,084 A | 7/1997 | Patton et al. | |
| 6,184,316 B1 * | 2/2001 | Masi et al. ............. | 526/128 X |

* cited by examiner

*Primary Examiner*—Fred Teskin

(57) ABSTRACT

A process for preparing syndiotactic vinylidene aromatic polymers comprising contacting one or more vinylidene aromatic monomers with a concentrated catalyst premix composition comprising a Group 4 metal complex and an activating cocatalyst.

8 Claims, No Drawings

SYNDIOTACTIC VINYLIDENE AROMATIC POLYMERIZATION PROCESS

This application claims priority from U.S. Provisional Application No. 60/080,964 filed on Apr. 7, 1998.

The present invention relates to a process for polymerizing vinylidene aromatic monomers, such as styrene, to produce polymers having a high degree of syndiotactidty, using a catalyst composition comprising a Group 4 metal complex.

In U.S. Pat. No. 4,680,353, there is disclosed a process for the preparation of polymers of vinylidene aromatic monomers having a stereoregular structure of high syndiotacticity, by the use of a catalyst system comprising a titanium catalyst and an alumoxane cocatalyst. The catalyst system is used as a dilute mixture in an organic solvent.

In U.S. Pat. No. 5,066,741 there are disclosed certain cationic metal compounds formed by reacting a Group 4 metal complex with ammonium or phosphonium salts of Bronsted acids containing a non-coordinating compatible anion or with cationic oxidizers containing a noncoordinating compatible anion. The complexes are usefully employed as catalysts in the polymerization of polymers of vinylidene aromatic monomers having a stereoregular structure of high syndiotacticity.

In U.S. Pat. No. 5,374,696, certain Group 4 metal complexes wherein the metal is in the +3 oxidation state and their use as addition polymerization catalysts are disclosed.

According to the present invention there is now provided a novel process for preparing polymers of vinylidene aromatic monomers having a high degree of syndiotacticity. The process comprises contacting at least one polymerizable vinylidene aromatic monomer under polymerization conditions with a concentrated catalyst premix composition comprising:

a) a Group 4 metal complex corresponding to the formula:

CpmMXnX'p wherein:
Cp is a single η5-cyclopentadienyl or η5-substituted cyclopentadienyl group, the substituted cyclopentadienyl group being optionally also bonded to M through a substituent X;
M is a metal of Group 4 or the Lanthanide Series of the Periodic Table;
X is in each occurrence an inert anionic ligand of up to 20 nonhydrogen atoms and optionally X and Cp are joined together;
X' is an inert, neutral donor ligand;
m and p are independently 0 or 1;
n is an integer greater than or equal to 1; and
the sum of m and n is equal to the oxidation state of the metal; and b) an activating cocatalst, wherein the concentrated catalyst premix composition contains no additional solvent.

Compared to polymerization processes utilizing a similar catalyst composition which is diluted with an inert solvent, the present process achieves a significantly improved conversion of monomer and greater efficiency in use, thereby permitting a reduction in the quantity of metal complex employed and eliminating the solvent removal or recycle. Lower metal residuals give the additionally advantage of improved color and thermal stability in the polymer produced.

The resulting syndiotactic polymers may be used in the preparation of articles such as a moldings, films, sheets and foamed objects. Detailed Description of the Invention The present invention is a method of producing a syndiotactic vinylidene aromatic polymer. As used herein, the term "syndiotactic" refers to polymers having a stereoregular structure of greater than 50 percent syndiotactic of a racemic triad as determined by 13 C nuclear magnetic resonance spectroscopy. Such polymers may be usefully employed in the preparation of articles and objects (for example, via compression molding, injection molding or other suitable technique) having an extremely high resistance to deformation due to the effects of temperature.

In the practice of the present invention, suitable vinylidene aromatic monomers useful in preparing the syndiotactic vinylidene aromatic polymers include those represented by the formula:

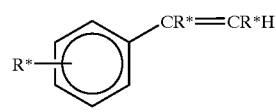

wherein each R* is independently hydrogen; an aliphatic, cycloaliphatic or aromatic hydrocarbon group having from 1 to 10, more suitably from 1 to 6, most suitably from 1 to 4, carbon atoms; or a halogen atom. Examples of such monomers include, styrene, chlorostyrene, n-butylstyrene, vinyltoluene, and α-methylstyrene, with styrene being especially suitable. Copolymers of styrene and the above vinylidene aromatic monomers other than styrene can also be prepared.

The concentrated catalyst premix composition used in the process of the present invention comprises a Group 4 metal complex and an activating cocatalyst. All reference to the Periodic Table of the Elements herein shall refer to the Periodic Table of the Elements, published and copyrighted by CRC Press, Inc., 1989. Also, any reference to a Group or Series shall be to the Group or Series as reflected in this Periodic Table of the Elements, utilizing the IUPAC system for numbering groups.

With respect to the metal complexes, illustrative but nonlimiting examples of X include hydrocarbyl, silyl, halo, NR$_2$, PR$_2$, OR, SR, and BR$_2$, wherein R is C$_{1-20}$ hydrocarbyl.

Illustrative but nonlimiting examples of X' include ROR, RSR, NR$_3$, PR$_3$, and C$_{2-20}$ olefins or diolefins, wherein R is as previously defined. Such donor ligands are able to form shared electron bonds but not a formal covalent bond with the metal.

Preferred monocyclopentadienyl and substituted monocyclopentadienyl groups for use according to the present invention are more specifically depicted by the formula:

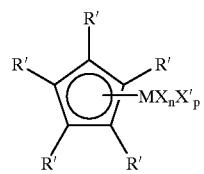

wherein:
M is titanium;
X independently each occurrence is hydrogen, halide, R, or OR;
R is C$_{1-10}$ hydrocarbyl group;
X' is a C$_{4-40}$ conjugated diene;
n is 1, 2 or 3;

p is 1 when n is 1, and p is 0 when n is 2 or 3;

R' is in each occurrence independently selected from the group consisting of hydrogen, halogen, R, $NR_2$, $PR_2$; OR; SR or $BR_2$, or one or two pairs of adjacent R' hydrocarbyl groups are joined together forming a fused ring system.

Preferably, the cyclic moiety comprises a cyclopentadienyl- indenyl, fluorenyl-, tetrahydrofluorenyl-, or octahydrofluorenyl- group or a $C_{1-6}$ hydrocarbyl substituted derivative thereof, n is three, p is zero, X is $C_{1-4}$ alkyl or alkoxide. Most highly preferred metal complexes comprise pentamethylcyclopentadienyltitanium trimethyl, pentamethylcyclopentadienyltitanium tribenzyl, pentamethylcyclopenta-dienyltitanium trimethoxide, octahydrofluorenyltitanium tribenzyl, octahydrofluorenyltitanium trimethyl or octahydrofluorenyltitanium trimethoxide.

In a preferred embodiment, the metal complex is a metal trialkoxide which is combined with a trialkyialuminum or trialkylboron compound such as triethyl aluminum, tri n-propyl aluminum, tri isopropyl aluminum, tri n-butyl aluminum, triisobutyl aluminum, and mixtures thereof, either prior to or simultaneously with the activating cocatalyst to form the active catalyst premix composition. It is believed, without wishing to be bound by such belief that the trialkylaluminum compound or trialkylboron compound causes the in situ transfer of the alkyl group to the Group 4 metal complex prior to activation thereof.

The metal complexes are rendered catalytically active by combination with an activating cocatalyst. Suitable activating cocatalysts for use herein include polymeric or oligomeric alumoxanes, especially methylalumoxane(MAO), tri-isobutyl aluminum modified methylalumoxane, isopropyl alumoxane or diisobutylalumoxane; strong Lewis acids, such as $C_{1-30}$ hydrocarbyl substituted Group 13 compounds, especially tri(hydrocarbyl)aluminum- or tri(hydrocarbyl) boron- compounds and halogenated derivatives thereof, having from 1 to 10 carbons in each hydrocarbyl or halogenated hydrocarbyl group, especially tris (pentafluorophenyl)borane; and nonpolymeric, inert, compatible, noncoordinating, ion forming compounds (including the use of such compounds under oxidizing conditions). The foregoing activating cocatalysts and activating techniques have been previously taught with respect to different metal complexes in the following references: EP-A-277,003, U.S. Pat. Nos. 5,153,157, 5,064,802, EP-A-468,651, EP-A-520,732, and WO93/23412.

Suitable nonpolymeric, inert, compatible, noncoordinating, ion forming compounds useful as cocatalysts in one embodiment of the present invention comprise a cation which is a Bronsted acid capable of donating a proton, and a compatible, noncoordinating, anion, $A^-$. Preferred anions are those containing a single coordination complex comprising a charge-bearing metal or metalloid core which anion is capable of balancing the charge of the active catalyst species (the metal cation) which is formed when the two components are combined. Also, said anion can be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are well known and many, particularly such compounds containing a single boron atom in the anion portion, are available commercially.

Preferably such cocatalysts may be represented by the following general formula:

$$(L^*-H)^+_d Ad^-$$

wherein:

L* is a neutral Lewis base;

$(L^*-H)+$ is a Bronsted acid;

Ad- is a noncoordinating, compatible anion having a charge of d⁻, and d is an integer from 1 to 3.

More preferably d is one, that is, Ad⁻ is A⁻.

Highly preferably, A⁻ corresponds to the formula:

$$[BQ_4]^-$$

wherein:

B is boron in the +3 formal oxidation state; and

Q independently each occurrence is selected from hydride, dialkylamido, halide, alkoxide, aryloxide, hydrocarbyl, halocarbyl, and halosubstituted-hydrocarbyl radicals, said Q having up to 20 carbons with the proviso that in not more than one occurrence is Q halide.

In a more highly preferred embodiment, Q is a fluorinated $C_{1-20}$ hydrocarbyl group, most preferably, a fluorinated aryl group, especially, pentafluorophenyl.

Illustrative, but not limiting, examples of ion forming compounds comprising proton donatable cations which may be used as activating cocatalysts in the process of the present invention are tri-substituted ammonium salts such as:

trimethylammonium tetraphenylborate,
methyldioctadecylammonium tetraphenylborate,
triethylammonium tetraphenylborate,
tripropylammonium tetraphenylborate,
tri(n-butyl)ammonium tetraphenylborate,
methyltetradecyloctadecylammonium tetraphenylborate,
N,N-dimethylanilinium tetraphenylborate,
N,N-diethylanilinium tetraphenylborate,
N,N-dimethyl(2,4,6-trimethylanilinium) tetraphenylborate,
trimethylammonium tetrakis(pentafluorophenyl)borate,
methylditetradecylammonium tetrakis(pentafluorophenyl) borate,
methyldioctadeclyammonium tetrakis(pentafluorophenyl) borate,
triethylammonium tetrakispentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl(2,4,6-trimethylanilinium) tetrakis(pentafluorophenyl)borate,
trimethylammonium tetrakis(2,3,4,6-tetrafluornphenyl borate,
triethylammonium tetrakis(2,3,4,6-tetrafluorophenyl)borate,
tripropylammonium tetrakis(2,3,4,6-tetrafluorophenyl) borate,
tri(n-butyl)ammonium tetrakis(2,3,4,6-tetrafluorophenyl) borate,
dimethyl(t-butyl)ammonium tetrakis(2,3,4,6-tetrafluorophenyl)borate,
N,N-dimethylanilinium tetrakis(2,3,4,6-tetrafluorophenyl) borate,
N,N-diethylanilinium tetrakis(2,3,4,6-tetrafluorophenyl) borate, and N,N-dimethyl-(2,4,6-trimethylanilinium) tetrakis-(2,3,4,6-tetrafluoro-phenyl)borate.

Dialkyl ammonium salts such as:

dioctadecylammonium tetrakis(pentafluorophenyl)borate,
ditetradecylammonium tetrakis(pentafluorophenyl)borate, and
dicyclohexylammonium tetrakis(pentafluorophenyl)borate.

Tri-substituted phosphonium salts such as:

triphenylphosphonium tetrakis(pentafluorophenyl)borate,
methyldioctadecylphosphonium tetrakis(pentafluorophenyl)borate, and
tri(2,6-dimethylphenyl)phosphonium tetrakis(pentafluorophenyl)borate.

Preferred are tetrakis(pentafluorophenyl)borate salts of long chain alkyl mono- and disubstituted ammonium complexes, especially $C_{14}$–$C_{20}$ alkyl ammonium complexes, especially methyldi(octadecyl)ammonium tetrakis(pentafluorophenyl)borate and methyldi(tetradecyl)ammonium tetrakis(pentafluorophenyl)borate.

Another suitable ion forming, activating cocatalyst comprises a salt of a cationic oxidizing agent and a noncoordinating, compatible anion represented by the formula:

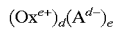
$$(Ox^{e+})_d(A^{d-})_e$$

wherein:

$Ox^{e+}$ is a cationic oxidizing agent having charge e+;

e is an integer from 1 to 3; and $A^{d-}$, and d are as previously defined.

Examples of cationic oxidizing agents include: ferrocenium, hydrocarbyl-substituted ferrocenium, $Ag^+$, or $Pb^{+2}$. Preferred embodiments of $A^{d-}$ are those anions previously defined with respect to the Bronsted acid containing activating cocatalysts, especially tetrakis(pentafluorophenyl)borate.

Another suitable ion forming, activating cocatalyst comprises a compound which is a salt of a carbenium ion or silylium ion and a noncoordinating, compatible anion represented by the formula:

$$©^+ A^-$$

wherein:

$©^+$ is a $C_{1-20}$ carbenium ion or silylium ion; and $A^-$ is as previously defined.

A preferred carbenium ion is the trityl cation, that is triphenylcarbenium. A preferred silylium ion is triphenylsilylium.

The concentrated catalyst premix composition typically comprises a molar ratio of metal complex:cocatalyst of 1:0.1 to 1:1000, preferably from 1:0.1 to 1:800, more preferably from 1:0.5 to 1:500 and most preferably from 1:1 to 1:200.

The foregoing activating cocatalysts can also be used in combination with a tri(hydrocarbyl)-aluminum compound having from 1 to 10 carbons in each hydrocarbyl group, an oligomeric or polymeric alumoxane compound, a di(hydrocarbyl)(hydrocarbyloxy)aluminum compound having from 1 to 20 carbons in each hydrocarbyl or hydrocarbyloxy group, or a mixture of the foregoing compounds, if desired. these aluminum compounds are usefully employed for their beneficial ability to scavenge impurities such as oxygen, water, and aldehydes from the polymerization mixture. The molar ratio of aluminum compound to metal complex is preferably from 10,000:1 to 1:1, more preferably from 5000:1 to 10:1, most preferably from 200:1 to 25:1.

Suitable di(hydrocarbyl)(hydrocarbyloxy)aluminum compounds correspond to the formula $T^1{}_2AlOT^2$ wherein T1 is $C_{3-6}$ secondary or tertiary alky, most preferably isopropyl, isobutyl or tert-butyl; and T2 is a $C_{12-30}$ alkaryl radical or aralkyl radical, most preferably, 2,6-di(t-butyl)-4-methylphenyl, 2,6-di(t-butyl)4-methyltolyl, 2,6-di(i-butyl)-4-methylphenyl, or 4-(3',5'-ditertiarybutyltolyl)-2,6-ditertiarybutylphenyl Preferred aluminum compounds include $C_{2-6}$ trialkyl aluminum compounds, especially those wherein the alkyl groups are ethyl, propyl, isopropyl, n-butyl, isobutyl, pentyl, neopentyl, or isopentyl, dialkyl(aryloxy)aluminum compounds containing from 1–6 carbons in the alkyl group and from 6 to 18 carbons in the aryl group, (especially (3,5-di(t-butyl)-4-methylphenoxy)diisobutyaluminum.

An especially preferred activating cocatalyst comprises the combination of a trialkyl aluminum compound having from 1 to 4 carbons in each alkyl group and an ammonium salt of tetrakis(pentafluoro-phenyl)borate, in a molar ratio from 5:1 to 50:1, or the combination of such a trialkyl aluminum compound with up to 1000 mole percent (based on M) of an alkylalumoxane, or both of the foregoing combinations. Especially preferred activating cocatalysts comprise a trialkylaluminum compound with methylaluminoxane in a mole ratio of 1:1 to 1:5; or a trialkyl aluminum compound and an ammonium salt of tetralds(pentafluorophenyl)borate, in a molar ratio from 5:1 to 50:1.

The concentrated catalyst premix composition is prepared separately prior to the addition to polymerizable monomers. In general, the concentrated catalyst premix composition can be prepared by combining the metal complex and activating cocatalyst at a temperature within the range from $^-100°$ C. to 100° C. in the absence of additional inert solvent. If methylaluminoxane (MAO) is used as the activating cocatalyst in the catalyst premix composition, it is typically obtained commercially as a 10 to 30 percent by weight solution of MAO in toluene. Therefore, the only solvent present in such a premix composition comprising MAO would be due to the solvent associated with the commercial MAO product. The catalysts' components are sensitive to both moisture and oxygen and should be handled and transferred in an inert atmosphere.

The concentrated catalyst premix composition is typically a neat solution obtained by combining the components in the absence of diluent. When MAO is used as the activating cocatalyst, the catalyst premix will comprise from 45 to 85 percent solvent due to the solvent present in commercial MAO. However, further diluent or solvent is not added.

Additionally, the polymerization can be conducted in the presence of a catalyst adjuvant. Catalyst adjuvants such as alkylsilane, substituted alkylsilanes, dialkyisilanes, substituted dialkylsilanes, arylsilanes, diarylsilanes, substituted arylsilanes or substituted diarylsilanes can also be used. Preferred adjuvants include diphenylsilane and phenylsilane.

The polymerization is preferably conducted under solventless conditions such as bulk polymerization conditions or other suitable reaction conditions including solid, powdered reaction conditions. The polymerization can be conducted at temperatures of from 0° C. to 160° C., preferably from 25° C. to 100° C., more preferably from 30° C. to 80° C., for a time sufficient to produce the desired polymer. Typical reaction times are from one minute to 100 hours, preferably from 1 to 10 hours. The optimum reaction time or reactor residence time will vary depending upon the temperature, solvent and other reaction conditions employed. The polymerization can be conducted at subatmospheric pressure as well as super-atmospheric pressure, suitably at a pressure within the range of 1 to 500 psig (6.9 kPa–3,400 kPa). The use of ambient or low pressures, for example, 1–5 psig (6.9–34.5 kPa) is preferred in view of lower capital and equipment costs.

The molar ratio of the vinylidene aromatic monomer to catalyst premix (in terms of Moles) may range from 100:1 to $1 \times 10^{10}$:1, preferably from 1000:1 to $1 \times 10^{6}$:1.

As in other similar polymerizations, it is highly desirable that the monomers employed be of sufficiently high purity that catalyst deactivation does not occur. Any suitable technique for monomer purification such as devolatilizaton at reduced pressures, contacting with molecular sieves or high surface area alumina, deaeration, or a combination thereof may be employed.

Purification of the resulting polymer to remove entrained catalyst and cocatalyst may also be desired by the practitioner. Such contaminants may generally be identified by residues of ash on pyrolysis of the polymer that are attributable to catalyst or cocatalyst metal values. A suitable technique for removing such compounds is by solvent extraction, for example, extraction utilizing hot, high boiling chlorinated solvents, acids or bases such as caustic followed by filtration.

The concentrated catalyst premix composition used in the present invention is surprisingly stable for storage without further dilution in a solvent or diluent. Additionally, the concentrate increases the catalyst activity in the polymerization of the vinylidene aromatic monomer.

Having described the invention, the following examples are provided as further illustrative and are not to be construed as limiting. The skilled artisan will appreciate that the invention disclosed herein may be practiced in the absence of any component which has not been specifically disclosed. Unless stated to the contrary, all parts and percentages are based on weight.

EXAMPLES 1–4

All reactions are conducted under inert atmosphere in a dry box. Styrene monomer is purified by removing oxygen, passing through activated alumina, and hydrogenation using Pd on alumina to remove phenylacetylene. Solvent, if used, is purified by sparging with $N_2$ and passing through activated alumina and handled using standard inert atmosphere techniques.

Catalyst premix solutions are prepared by combining the required amount of a 10 percent methylaluminoxane (MAO) solution in toluene, neat triisobutylaluminum (TIBA) and the indicated amount of titanium complexes in ampoules in a dry box. The following premixes are prepared:

1500 μl of 1.5 Molar MAO, 189.2 μl of neat TIBA and 7.7 μl of neat pentamethylcyctopentadienyltitanium trimethoxide (Cp*Ti(OCH$_3$)$_3$).

1500 μl of 1.5 Molar MAO, 189.2 μl of neat TIBA and 8.1 μl of neat Octahydrofluorenyltitanium trimethoxide [656]Ti(OCH$_3$)$_3$.

Polymerizations are conducted in septum capped, crimp sealed ampoules. The ampoules are charged with 10 ml of styrene. Each premix is placed in a septum capped, crimp sealed ampoule and removed from the dry box. The ampoules are equilibrated at the polymerization temperature for 10 minutes. Polymerizations are initiated via addition of the desired amount of concentrated catalyst premix solution described above. The mole ratio of styrene to titanium is 200,000:1. After 30 minutes reaction time the polymerization is quenched by the addition of methanol. Each polymer sample is isolated and dried at 150° C. for 30 minutes and 250° C. for 30 minutes, then weighed in order to determine the percent conversion. Molecular weight of the resulting syndiotactic polymer is determined via standard solution viscometry using atactic polystyrene standards. All polymers have melting points in excess of 260° C. consistent with tacticities of greater than 50 percent based on a racemic triad. Results are shown in Table I.

Comparative Examples are prepared by charging ampoules with 10 ml of styrene, 21 μl of 10 percent MAO solution in toluene, 11 μl of 1 Molar TIBA in toluene. The ampoules are septum capped, crimped, sealed and removed from the dry box. They are equilibrated at polymerization temperature for 10 minutes. Polymerization is initiated by the addition of 15 μl of a 0.03 Molar solution of titanium complex in toluene. The mole ratio of styrene to titanium is 200,000:1. The results are listed in Table I.

TABLE I

| Ex. | Time (min.) | Temp. (° C.) | conversion (percent) Cp*Ti(OMe)$_3$ | conversion (percent) [656]Ti(OMe)$_3$ |
|---|---|---|---|---|
| 1 | 15 | 50 | 41.2 | 42 |
|   | 30 | 50 | 61 | 65.3 |
|   | 60 | 50 | 71 | 75.2 |
| 2 | 15 | 70 | 35.5 | 40.2 |
|   | 30 | 70 | 40.8 | 46.1 |
|   | 60 | 70 | 49.7 | 53.7 |
| 3* | 15 | 50 | 11.1 | 34.4 |
|   | 30 | 50 | 17.6 | 56.3 |
|   | 60 | 50 | 23.5 | 73.4 |
| 4* | 15 | 70 | 18.0 | 31.1 |
|   | 30 | 70 | 34.5 | 32.3 |
|   | 60 | 70 | 37.8 | 47.2 |

*Comparative Examples
The percent conversions are higher for the concentrated premix catalyst. Additionally, the concentrated catalyst premix solution is unexpectedly homogeneous and remains stable on storage.

EXAMPLE 5

A neat catalyst premix is prepared using 1415 ml of 10 percent MAO in toluene, 189 ml of neat TIBA and 8.1 ml octahydrofluorenyltitanium trimethoxide. Ampoules are charged with 5 ml of styrene and equilibrated at 50° C. Polymerization is initiated by addition of 6.7 ml of the concentrated catalyst premix.

The mole ratios of S:MAO:TIBA:Ti are 350,000:75:25:1. Polymerization is conducted for 30 minutes and quenched via addition of methanol. The polymer is isolated and dried as in Examples 1–4.

The conversion is 36.2 percent.

EXAMPLE 6

Comparative Example

A catalyst premix, 0.003 Molar in titanium, is prepared using 708 ml of 10 percent MAO in toluene, 375 ml of 1 Molar TIBA, 500 ml of 0.03 Molar solution of octahydrofluorenyltitanium trimethoxide in toluene and sufficient additional toluene to make 5 ml total volume. Ampoules are charged with 5 ml of styrene and equilibrated at 50° C. Polymerization is initiated by addition of 42 ml of the 0.003 Molar catalyst premix.

The mole ratios of S:MAO:TIBA:Ti are 350,000:75:25:1. Polymerization is conducted for 30 minutes and quenched via addition of methanol. The polymer is isolated and dried as described in Examples 1–4.

The conversion is 18.4 percent.

It is clear from comparing Examples 5 and Comparative Example 6, that the polymerization conversion is significantly increased when using a concentrated catalyst premix without additional solvent.

What is claimed is:

1. A process for preparing syndiotactic polymers of vinylidene aromatic monomers comprising contacting one or more vinylidene aromatic monomers under polymerization conditions with a catalytically effective amount of a concentrated catalyst premix composition comprising:

a) a metal complex corresponding to the formula:

$$Cp_mMX_nX'_p$$

wherein:
   Cp is a single η5-cyclopentadienyl or η5-substituted cyclopentadienyl group, the substituted cyclopentadienyl group being optionally also bonded to M through a substituent X;
   M is a metal of Group 4 or the Lanthanide Series of the Periodic Table;
   X in each occurrence is hydrogen, an inert anionic ligand of up to 20 nonhydrogen atoms and optionally X and Cp are joined together;
   X' is an inert, neutral donor ligand;
   m and p are independently 0 or 1;
   n is an integer greater than or equal to 1; and
   the sum of m and n is equal to the oxidation state of the metal;

b) an activating cocatalyst, wherein the concentrated catalyst premix composition contains no additional solvent.

2. The process according to claim 1 wherein the monovinylidene aromatic monomer is represented by the formula:

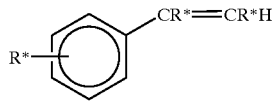

wherein each R* is independently hydrogen; an aliphatic, cycloaliphatic or aromatic hydrocarbon group having from 1 to 10 carbon atoms; or a halogen atom.

3. The process according to claim 2 wherein the vinylidene aromatic monomer is styrene.

4. The process according to claim 1 wherein the Group 4 meal complex corresponds to the formula:

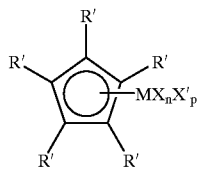

wherein:

M is titanium;

X independently each occurrence is hydrogen, halide, R, or OR;

R is $C_{1-10}$ hydrocarbyl group;

X' is a $C_{4-40}$ conjugated diene;

n is 1, 2 or 3;

p is 1 when n is 0, and p is 0 when n is 2 or 3;

R' each occurrence is independently selected from the group consisting of hydrogen, halogen, R, $NR_2$, $PR_2$; OR; SR or $BR_2$, or one or two pairs of adjacent R' hydrocarbyl groups are joined together forming a fused ring system.

5. The process according to claim 1 wherein an adjuvant is additionally present and is phenylsilane or diphenylsilane.

6. The process of claim 1 wherein the concentrated catalyst premix composition comprises:

a) a pentamethylcyclopentadienyltitanium tri($C_{1-4}$) alkoxide or an octahydrofluorenyltitanium tri($C_{1-4}$) alkoxide in combination with a tri($C_{1-6}$) alkylaluminum; and b) methylalumoxane.

7. The process of claim 6 wherein the catalyst premix composition comprises pentamethylcyclopentadienyltitanium trimethoxide.

8. The process of claim 6 wherein the catalyst premix composition comprises octahydrofluorenyltitanium trimethoxide.

* * * * *